United States Patent
Goodman et al.

(10) Patent No.: US 7,089,547 B2
(45) Date of Patent: Aug. 8, 2006

(54) FIRMWARE UPDATING

(75) Inventors: Brian Gerard Goodman, Tucson, AZ (US); Robert Alan Klem, Tucson, AZ (US); Timothy Keith Pierce, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 10/242,750

(22) Filed: Sep. 13, 2002

(65) Prior Publication Data

US 2004/0054883 A1   Mar. 18, 2004

(51) Int. Cl.
G06F 9/44 (2006.01)
G06F 9/445 (2006.01)
G06F 9/00 (2006.01)

(52) U.S. Cl. ............. 717/168; 717/169; 717/170; 717/171; 717/174; 713/1; 713/2

(58) Field of Classification Search ........ 717/168–171, 717/174; 713/1, 2
See application file for complete search history.

(56) References Cited

U.S. PATENT DOCUMENTS

| | | | |
|---|---|---|---|
| 5,878,256 A | 3/1999 | Bealkowski et al. | 395/652 |
| 6,357,021 B1 | 3/2002 | Kitagawa et al. | 714/41 |
| 6,708,231 B1* | 3/2004 | Kitagawa | 710/10 |
| 6,754,828 B1* | 6/2004 | Marisetty et al. | 713/200 |
| 2002/0073304 A1* | 6/2002 | Marsh et al. | 713/1 |
| 2003/0020938 A1* | 1/2003 | Terada et al. | 358/1.13 |
| 2003/0074657 A1* | 4/2003 | Bramley, Jr. | 717/168 |
| 2004/0030877 A1* | 2/2004 | Frid | 713/1 |

* cited by examiner

*Primary Examiner*—Wei Zhen
*Assistant Examiner*—Qamrun Nahar
(74) *Attorney, Agent, or Firm*—John H. Holcombe (57) ABSTRACT

Updating firmware stored in a rewritable non-volatile memory as a plurality of firmware code images having position dependent code. A plurality of update code images are made available that have position dependent code specifying positions of a rewritable non-volatile memory, such that each update code image is suitable for replacing a different stored code image. A computer processor determines which stored code image is to be updated; and selects the one of the plurality of update code images that has position dependent code suitable for replacing the code image to be updated.

27 Claims, 5 Drawing Sheets

FIRMWARE UPDATING

Commonly assigned U.S. patent application Ser. No. 09/551,844, filed Apr. 18, 2000, is incorporated for its showing of providing and of updating redundant, self-bootable firmware.

FIELD OF THE INVENTION

This invention relates to firmware stored in rewritable non-volatile memory, and, more particularly, to updating firmware stored in rewritable non-volatile memory which is capable of storing a plurality of firmware code images.

BACKGROUND OF THE INVENTION

Firmware, or computer readable program code stored in non-volatile memories, is employed for microprocessors, for example, of embedded systems which implement specialized functions or service. Modems, answering machines, automobile controls, disk drives, tape drives, digital cameras, medical drug infusion systems, and storage automation products are all examples of systems that may comprise embedded systems. The processor control in these systems allows a level of flexibility that can reduce costs while improving product quality.

It may be advantageous to provide the capability to upgrade the system firmware of the embedded system. This simplifies the task of providing enhancements and fixes to the product. For example, it is common to provide product enhancements in the form of new features and functions. As one example, after the 56K modem technology was introduced, many modem manufacturers provided firmware updates to existing customers. The updates allowed existing modems to support the new technology for increased communication speeds. As another example, the IBM 3584 Ultra Scalable Tape Library was first introduced with LTO (Linear Tape Open) drive and media support, and subsequently, an enhancement was made to support "Quantum DLT" (Digital Linear Tape) drives and media. Especially with expensive systems, customers expect to be able to upgrade their products many years into the future with minimal cost and disruption.

It may be desirable, and in some cases crucial, to provide a failsafe firmware update to the embedded system. "Failsafe" means that even if the update step is disrupted, the embedded system will continue to operate to at least the level that it operated at, before the firmware update. For example, many embedded systems will become nonfunctional if the firmware update is disrupted. In U.S. Pat. No. 6,357,021, the firmware is stored in an updateable part and a fixed part. The fixed part comprises default tasks, and the updateable part stores any updates. Thus, the firmware stored in the fixed part will not be lost or corrupted by incomplete downloading of the updates. The problem is that if the firmware update is disrupted, the system must go back to the original defaults, and the most recent previous update will be lost, possibly making the embedded system nonfunctional.

Embedded systems then may require special procedures to get them operational again, for example, requiring authorized repair specialists, or requiring that the product be returned to the factory.

The incorporated '844 U.S. patent application provides a non-volatile memory having a plurality of separately erasable sectors or memory areas for storing at least two separate copies of operational code, and a boot program stored separately from the operational code. Any copy of the operational code may be updated without requiring an update of the boot code. For example, in the case of two copies, both copies may be the most recent update, or one copy may be more recent than the other. Any new update will be made to the downlevel operational code. Thus, the operational code which was successfully operating the system prior to the new update is preserved, and, in the case of disruption to the new update, the successfully operating code will simply resume its place.

Both copies, or images, of the operational code are independently executable. Some processors and compilers do not support position independent code, preventing execution of more than one copy of operational code. Additional memory may be used to copy either of the two code images into a RAM or other memory area for execution, and the firmware would be compiled to run at the address of the newly copied code in RAM. However, existing embedded systems may not have additional memory to hold a copy of the code image, and new systems would have to incur the additional cost and board space of the copy memory.

SUMMARY OF THE INVENTION

In accordance with aspects of the present invention, computer program products, computer implemented systems and methods are provided for updating firmware stored in a rewritable non-volatile memory which is capable of storing a plurality of firmware code images.

In one embodiment, where the firmware code images have position dependent code, a plurality of update firmware code images are made available that have position dependent code, the position dependent code specifying positions of a rewritable non-volatile memory, each firmware code image position dependent code specifying different positions of the rewritable non-volatile memory from any other firmware code image of the plurality of update firmware code images. Thus, each update firmware code image is suitable for replacing a different firmware code image stored in the non-volatile memory.

A computer processor determines which one of a plurality of firmware code images stored in the rewritable non-volatile memory is to be updated; and selects one of a plurality of update firmware code images that has position dependent code suitable for replacing the determined firmware code image to be updated.

In one embodiment, the computer processor indicates the selection at an interface, and the selected update firmware code image is supplied for updating.

In a further embodiment, the plurality of update firmware code images are supplied to the embedded system and stored in memory, and the computer processor selects the one update firmware code image from the plurality of code images stored in the memory.

The computer processor then copies the selected one update firmware code image from the memory to overwrite the determined firmware code image at the rewritable non-volatile memory.

In a still further embodiment, the plurality of update firmware code images are supplied to the embedded system at an interface, and the computer processor selects the one update firmware code image and directly overwrites the determined firmware code image at the rewritable non-volatile memory.

In another embodiment of the present invention, the computer readable program code for operating the computer processor to conduct the update is embedded in a boot sector of the non-volatile memory.

In a further embodiment, the computer readable program code for operating the computer processor to conduct the update is embedded in the firmware code image which is currently operational.

In a still further embodiment, the computer readable program code for operating the computer processor to conduct the update is embedded in at least one of the update firmware code images, and which program code is temporarily stored in a memory for execution of the program code.

In another aspect of the invention for updating firmware stored in a rewritable non-volatile memory which is capable of storing a plurality of firmware code images, wherein the plurality of firmware code images stored in the rewritable non-volatile memory comprise operational code, the computer processor:

determines which one of a plurality of firmware code images stored in the rewritable non-volatile memory is to be updated;

replaces the determined firmware code image to be updated with an update firmware code image;

determines whether the update firmware code image has successfully been stored in the rewritable non-volatile memory to overwrite the determined firmware code image; and if so, marks at least one non-updated firmware code image of the plurality of firmware code images stored in the rewritable non-volatile memory to prevent the marked firmware code image from subsequently being used as the current operational code.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
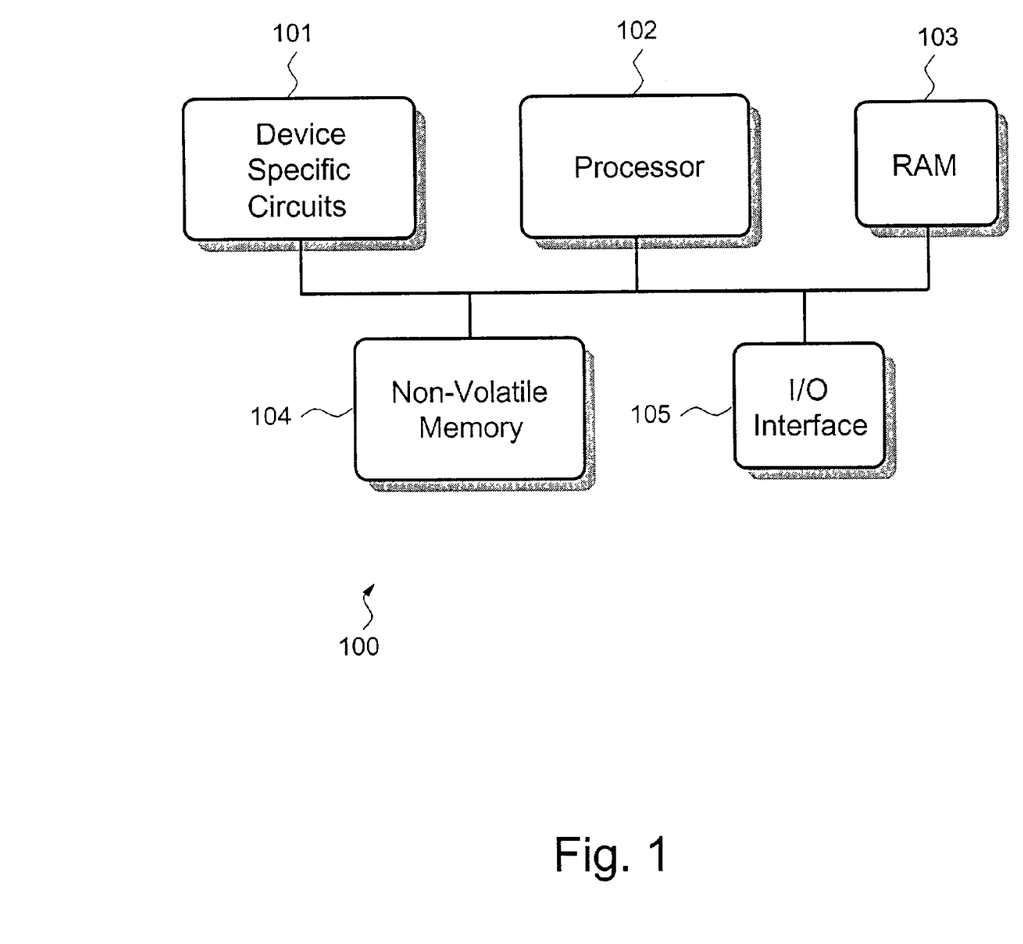
FIG. 1 is a block diagrammatic illustration of a microprocessor system which implements the present invention.

Referring to FIG. 1, an example of a microprocessor system 100 is illustrated, such as an embedded system which implements specialized functions or service. Examples of embedded systems are modems, answering machines, automobile controls, disk drives, tape drives, digital cameras, medical drug infusion systems, and storage automation products to control accessors or provide communications. The microprocessor system is illustrated with a computer processor 102, optional RAM (Random Access Memory) 103, a rewritable non-volatile memory 104, device specific circuits 101 and an I/O interface 105. The computer processor 102 may be an off-the-shelf microprocessor, custom processor, discrete logic, etc., as are known to those of skill in the art. The rewritable non-volatile memory 104 holds the executable firmware and any non-volatile data for the computer processor 102, and may be a flash PROM (Programmable Read-Only Memory), battery backup RAM, and other of many types of non-volatile memory are also known to those of skill in the art. The I/O interface 105 is some form of communication interface that allows the computer processor 102 to communicate with the outside world. Examples may include serial interfaces, SCSI (Small Computer Systems Interface), Ethernet, Fibre Channel interfaces, etc. A firmware update image is transferred through the I/O interface 105. The device specific circuits 101 provide additional hardware to enable an embedded system 100 to perform specific functions such as actuator control of a vehicle anti-lock braking system, motor control of an accessor for an automated data storage library, etc. The device specific circuits 101 may comprise electronics that provide Pulse Width Modulation (PWM) control, Analog to Digital Conversion (ADC), Digital to Analog Conversion (DAC), control for a Liquid Crystal Display (LCD), etc. Any of the elements of FIG. 1 may be combined into one or more components, for example, the non-volatile memory 104, RAM 103, and I/O interface 105 may comprise elements of the processor 102.

As discussed above, it may be advantageous to provide the capability to upgrade the system firmware of the embedded system. This simplifies the task of providing enhancements and fixes to the product. It may be desireable, and in some cases crucial, to provide a failsafe firmware update to the embedded system, such that, even if the update step is disrupted, the embedded system will continue to operate to at least the level that it operated at, before the firmware update. The incorporated '844 U.S. patent application provides a non-volatile memory having a plurality of separately erasable sectors or memory areas for storing at least two separate copies of operational code, and a boot program stored separately from the operational code. Any copy of the operational code may be updated without requiring an update of the boot code. For example, in the case of two copies, both copies may be the most recent update, or one copy may be more recent than the other. Any new update will be made to the downlevel operational code. Thus, the operational code which was successfully operating the system prior to the new update is preserved, and, in the case of disruption to the new update, the successfully operating code will simply resume its place.

Figure 2:
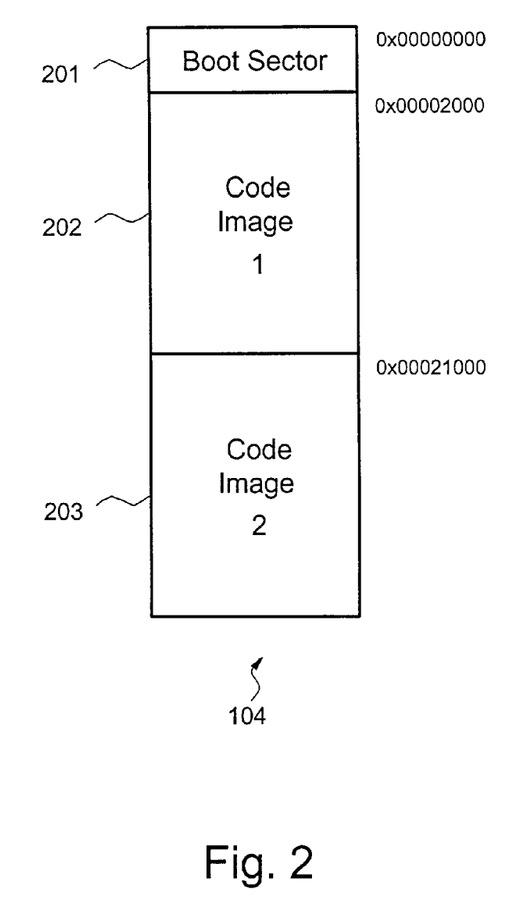
FIG. 2 is a diagrammatic representation of the content of the non-volatile memory of FIG. 1.

FIG. 2 illustrates an example of the content of the non-volatile memory 104 of FIG. 1. One portion of the non-volatile memory stores a boot sector 201 in which is written a relatively simple boot program. A plurality of firmware code images 202, 203 are illustrated comprising the firmware employed by the computer processor 102 of FIG. 1. Although two firmware code images are illustrated, several, or many firmware images may be employed.

Both copies, or images, of the operational code are independently executable. In some processors, position independent code may be supported, which employs relative addressing. Thus, either copy is executable in that the same relative addresses are employed for either copy. However, some processors and compilers do not support position independent code, preventing execution of more than one copy of operational code. As discussed above, additional memory may be used to copy either of the two code images into a RAM or other memory area for execution, and the firmware would be compiled to run at the address of the newly copied code in RAM. However, existing embedded systems may not have additional memory to hold a copy of the code image, and new systems would have to incur the additional cost and board space of the copy memory.

In FIG. 2, memory addresses are shown for the boot sector 201, a first code image 202 and a second code image 203. If the update code image were compiled to run beginning at hex address 00002000, and the first code image 202 begins at hex address 00002000, then the update code image would execute normally. However, if the same update code image is instead written to the second code image 203, then it cannot execute properly because the second code image 203 actually begins at hex address 00021000. An attempt to execute the firmware update image out of the second code image 203 would result in a fatal error, such as a processor exception.

Figure 3:
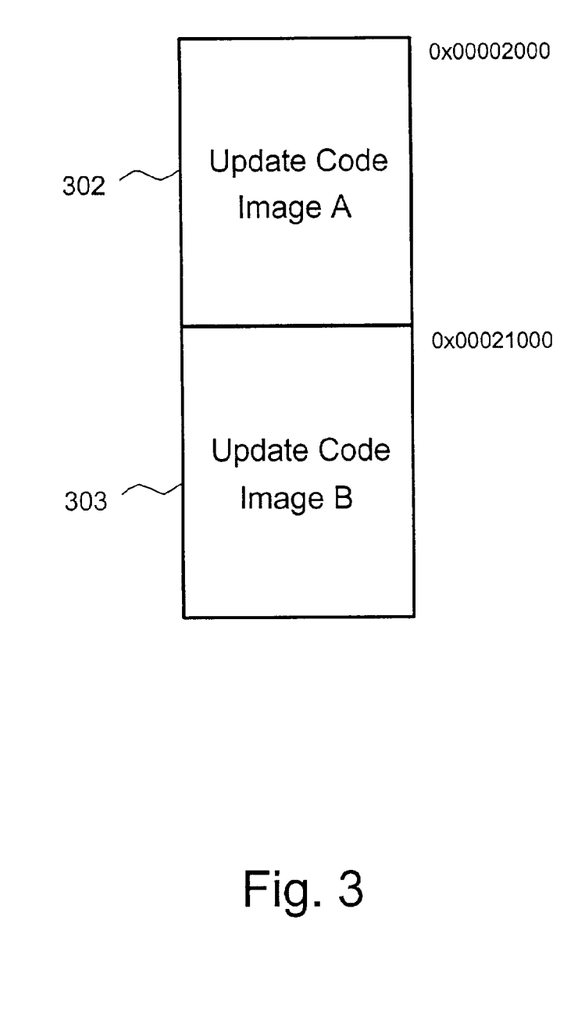
FIG. 3 is a diagrammatic representation of update firmware code images.

Referring to FIG. 3, in one embodiment of the present invention, where the firmware code images to be updated have position dependent code, a plurality of update firmware code images 302, 303 are made available that have position dependent code, the position dependent code specifying positions of a rewritable non-volatile memory. The position dependent code of update firmware code image 302 specifies different positions of the rewritable non-volatile memory 104 of FIG. 1 from any other firmware code image of the plurality of update firmware code images, as does the position dependent code of update firmware code image 303. In the examples of FIGS. 2 and 3, the position dependent code of update firmware image 302 begins at hex address 00002000 and the position dependent code of update firmware code image 303 begins at hex address 00021000. Thus, update firmware code image 302 is suitable for replacing firmware code image 202 and update firmware code image 303 is suitable for replacing firmware code image 203 stored in the non-volatile memory 104. Again, although only two update firmware images are illustrated, several, or many firmware images may be employed, each matching a different firmware code image of the non-volatile memory 104 of FIG. 1.

Thus, in accordance with the present invention, a computer processor, such as processor 102 of FIG. 1 determines which one of a plurality of firmware code images 202, 203 of FIG. 2 stored in the rewritable non-volatile memory 104 of FIG. 2 is to be updated; and selects one of a plurality of update firmware code images 302, 303 of FIG. 3 that has position dependent code suitable for replacing the determined firmware code image to be updated.

Figure 4:
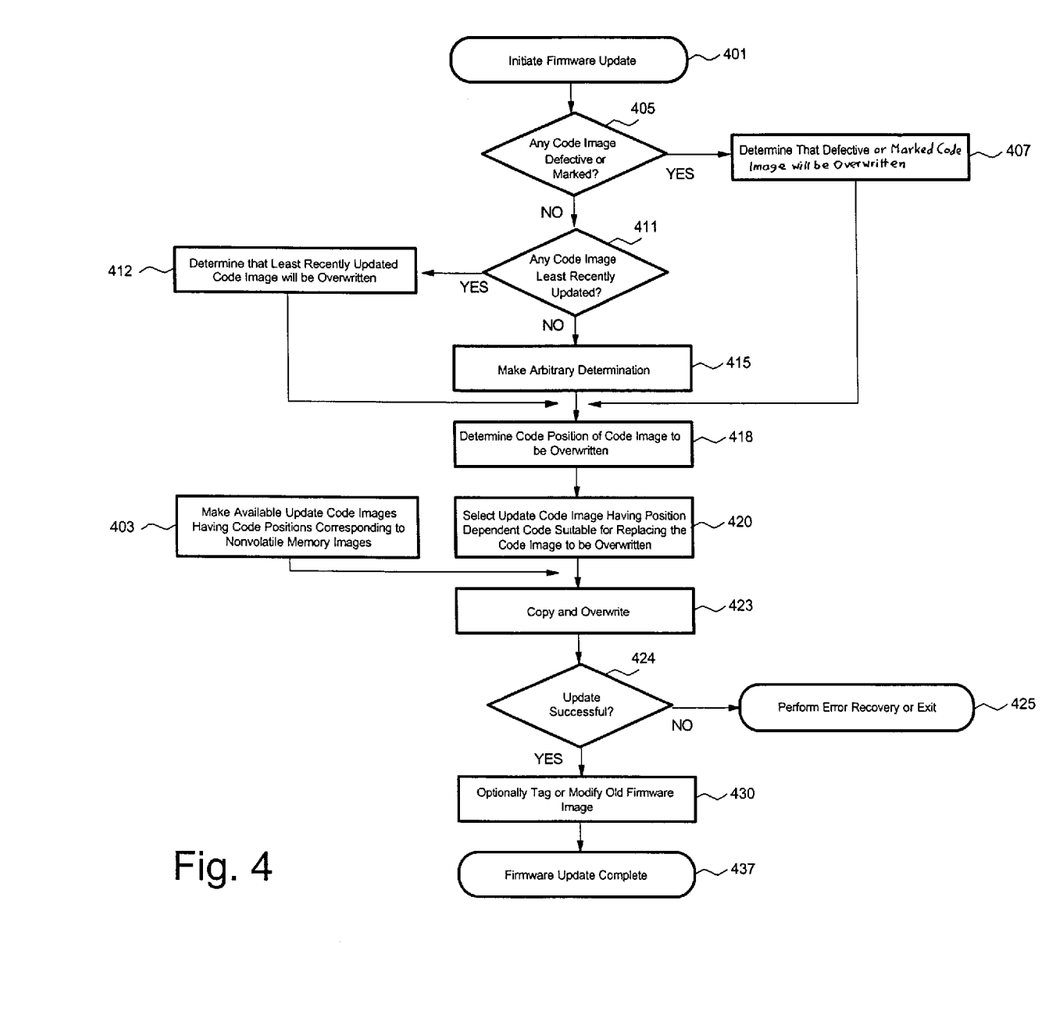
FIG. 4 is a flow chart depicting an embodiment of the method of the present invention for updating firmware of the system of FIG. 1.

FIG. 4 illustrates an embodiment of a computer implemented method for updating firmware code images in the non-volatile memory in accordance with the present invention. The computer program product implementing the present invention may comprise computer readable program code of the boot sector 201 of FIG. 2, or of the currently executing firmware code image 202, 203, or of the update firmware image 302, 303, and may comprise and be supplied from a diskette, etc., and communicated at interface 105 of FIG. 1. If the computer readable program code is embedded in one or more of the incoming update firmware code images 302, 303 of FIG. 3, the computer readable program code is copied to a memory, for example, RAM 103 of FIG. 1, and may have been compiled for execution from that memory location. If more than one update firmware code image embeds the computer readable program code, they may all have been compiled to execute from the same address. The computer readable program code may be read from the first supplied update firmware code image and makes the decision whether to select its image or another update image. The remainder of the process may be executed by the same computer readable program code that made the selection, or, alternatively, by computer readable program code of the selected code image.

In all of these examples, the computer program product computer readable program code may be copied to another memory, and is necessary in the case of computer readable program code from the update firmware image 302, 303, which must be copied for execution of the code.

The firmware update is initiated in step 401 of FIG. 4. This may be a manually initiated update by an operator or repair person, or it may be an automated firmware update initiated by a host computer, another embedded system, another processor, etc.

In step 405 of FIG. 4, the computer processor 102 of FIG. 1 checks to determine whether any of the firmware code images of the non-volatile memory 104, e.g., code images 202 or 203 of FIG. 2, is defective or marked for non-use. If one of the firmware code images is defective or marked for non-use, the processor, in step 407 of FIG. 4, determines that the defective code image will be the code image that is overwritten by an update code image.

If step 405 indicates that none of the firmware code images is marked or defective, step 411 determines whether any of the firmware code images is least recently updated as compared to at least one other firmware code image. Herein, the terminology "least recently updated" is defined as whether one firmware code image is downlevel or less recent as compared to at least one other firmware code image. It is important that the currently operational firmware image is retained, and not overwritten, even if it is the oldest. The least recently updated firmware may be indicated by a lower firmware version, a less recent date/time stamp, or some other indicator. If one of the firmware code images is least recently updated as compared to the other firmware code images, and is not the currently operational firmware, the processor, in step 412, determines that the least recently updated code image will be the code image that is overwritten by an update code image.

If step 405 indicates that none of the firmware code images is marked or defective, and step 411 indicates that none of the firmware code images is least recently updated as compared to at least one other firmware code image, an arbitrary decision is made in step 415 as to the code image that is to be overwritten by an update code image. Based on the determination of step 407, step 412, or step 415, the computer processor, in step 418, determines the position of the code image to be overwritten. The position of the image to be overwritten may comprise an arbitrary image number, address, offset, or some other indicator of which position is to be overwritten.

Then, in step 420, the computer processor selects and may report an indication of which firmware update image is required for the firmware update. The selected update code image will have position dependent code suitable for replacing the determined firmware code image to be overwritten and updated. In FIG. 1, the computer processor 102 may be triggered by a query from the updating computer, or it may be a request from the embedded system being updated. The processor 102 may report the selection at the interface 105, or, if the plurality of update firmware code images were received externally at the interface 105, the processor will select the desired update code image. For example, referring to FIGS. 2 and 3, if firmware code image 203 is determined to be the code image that will be overwritten, the update firmware code image 303, which has position dependent code suitable for replacing the determined firmware code image to be updated, will be selected.

In step 403, the updating system or operator makes available multiple update firmware images 302, 303 of FIG. 3, for the selection process. Each firmware update image has been compiled to execute from different memory addresses, as discussed above. The update firmware code images may be supplied together at I/O interface 105 of FIG. 1 and may be stored in memory, such as RAM 103, may be supplied in sequence and the selection made as the desired image appears at the I/O interface 105, or the desired firmware image may be supplied either by external request and a response by the computer processor 102, or may be supplied at the request of the computer processor 102.

In step 423, the selected update firmware code image is received and processor 102 writes it to the non-volatile memory and overwrites the firmware code image to be updated. The selected update firmware code image may be received at I/O interface 105 of FIG. 1 and saved in memory, such as RAM 103, prior to writing to the non-volatile memory 104, or it may be directly written to non-volatile memory while it is being received. In either case, the update firmware code image may be buffered as it is received.

In step 424 of FIG. 4, an optional check is made to determine if the firmware update has completed successfully. If the update was unsuccessful, error recovery procedures may be optionally performed in step 425 and/or the process may end without completing the firmware update.

If, however, the firmware update has completed successfully, the process moves to optional step 430. In step 430, one or more of the code images that were not updated, for example the firmware code image that was previously executing, or is currently executing, is marked to prevent it from being used at the next power-on or reset of the system 100. This may be an action that causes an identifier to be set, invalid checksum, invalid CRC, invalid signature field, etc. This step is optional because it may not be necessary for an embedded system that only supports firmware updates in one direction. For example, when selecting which code image 202, 203 of FIG. 2 to execute after a reset or power-on, if neither code image is defective, then the code image with the higher firmware version may be selected. Step 430 of FIG. 4 prevents the currently executing code image from being selected after down leveling the firmware. Step 430 may also be employed in the situation where position independent code is being updated, such as in the incorporated '844 U.S. patent application, to also prevent the currently executing image from being selected. The firmware update process ends at step 437 where the embedded system may be reset to begin execution of the new update code image.

Figure 5:
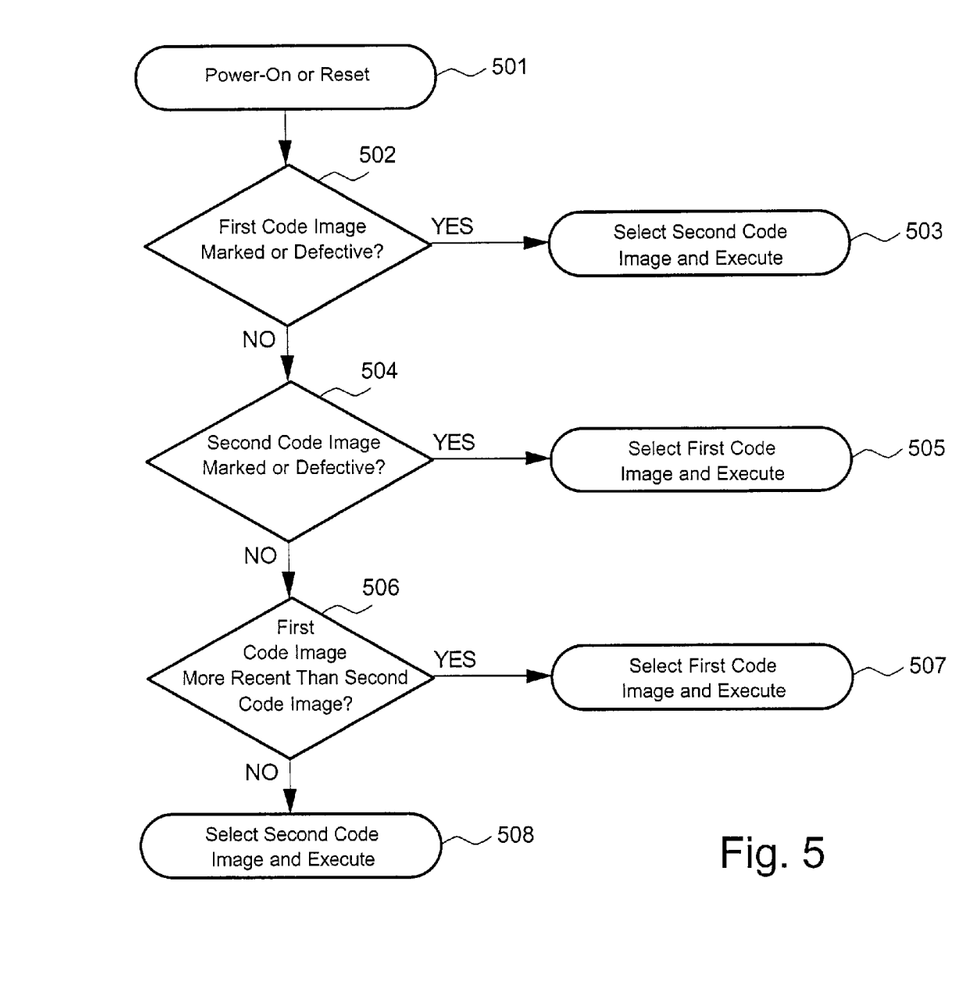
FIG. 5 is a flow chart depicting the selection of a firmware code image for execution for the system of FIG. 1.

Referring to FIG. 5, the code image selection process is illustrated following a reset or power-on of the embedded system 100 of FIG. 1. Referring to FIG. 2, firmware within the boot sector 201 is responsible for the steps of FIG. 5, as is discussed in the incorporated '844 U.S. patent application. In FIG. 5, only two firmware code images are illustrated, but, again, several or many firmware code images may be provided.

A power-on or reset occurs in step 501. In step 502, a check is made to determine if the first firmware code image 202 of FIG. 1 is marked or is defective. This may be a check for an identifier, checksum test, CRC test, check for valid signature field, etc. If the first code image is defective, the process moves to step 503 of FIG. 5, where the second code image 203 of FIG. 2 is selected and executed. Alternatively, step 503 of FIG. 5 could ensure that the second code image is intact and optionally perform an error recovery procedure or report an error if it is not intact. Further, if additional code images are provided, step 503 could be a repeat of step 502, and the process will then select still another code image for execution.

If, however, step 502 determines that the first code image 202 of FIG. 2 is not marked as in step 430 of FIG. 4, and is not defective, then the process moves to step 504 of FIG. 5. In step 504, a check is made to determine if the second code image 203 of FIG. 2 is marked or defective. Again, this may be a checksum test, etc. If the second code image is marked or defective, then control moves to step 505 of FIG. 5 where the first code image 202 of FIG. 2 is selected and executed. If step 505 of FIG. 5 concludes that the second code image is not marked or defective, the process moves to step 506.

In step 506, a check is made to determine which firmware code image is more recent. This may be indicated by a higher firmware version, a more recent date/time stamp, or some other indicator. If, in the instant example, the first code image 202 of FIG. 2 is more recent than the second code image 203, then the process moves to step 507 of FIG. 5 where the first code image is selected and executed. If, however, step 506 concludes that the first code image 202 of FIG. 2 is not more recent than the second code image 203, then control moves to step 508 of FIG. 5 where the second code image is selected and executed. Alternatively, if the downlevel code images are marked in step 430 of FIG. 4, steps 504, 506, 507 and 508 of FIG. 5 may be eliminated. In this case, a "NO" answer from step 502 would lead to step 505. This is possible because of the fact that there will always be a marked or defective code image from step 430 of FIG. 4.

Alternative arrangements of the computer processor and non-volatile store system, and alternative arrangements of the steps of FIGS. 4 and 5 may be envisioned by those of skill in the art.

While the preferred embodiments of the present invention have been illustrated in detail, it should be apparent that modifications and adaptations to those embodiments may occur to one skilled in the art without departing from the scope of the present invention as set forth in the following claims.

We claim:

1. A computer program product usable with a programmable computer having computer readable program code embodied therein, for updating firmware stored in a rewritable non-volatile memory, said rewritable non-volatile memory capable of storing a plurality of firmware code images, said firmware code images having position dependent code, comprising:

computer readable program code which causes a computer processor to determine which one of a plurality of firmware code images stored in said rewritable non-volatile memory is to be updated; and computer readable program code which causes a computer processor to select one of a plurality of update firmware code images that has position dependent code suitable for replacing said determined firmware code image to be updated.

2. The computer program product of claim 1, wherein said computer readable program code which causes a computer processor to select said update firmware code image, causes a computer processor to indicate said selection at an interface.

3. The computer program product of claim 1, wherein said computer readable program code which causes a computer processor to select said update firmware code image, causes a computer processor to select said one update firmware code image from a plurality of update firmware code images stored in memory.

4. The computer program product of claim 3, additionally comprising computer readable program code which causes a computer processor to copy said selected one update firmware code image from said memory to overwrite said determined firmware code image at said rewritable non-volatile memory.

5. The computer program product of claim 1, wherein said computer readable program code which causes a computer processor to select said update firmware code image, causes a computer processor to select said one update firmware code image from a plurality of update firmware code images supplied at an interface, and to overwrite said determined firmware code image at said rewritable non-volatile memory.

6. The computer program product of claim 1, wherein at least one of said plurality of firmware code images stored in said rewritable non-volatile memory comprises currently operational code, and said computer program product additionally comprising:
   computer readable program code which causes a computer processor to determine whether said selected one update firmware code image has successfully been stored in said rewritable non-volatile memory to overwrite said determined firmware code image; and
   computer readable program code which causes a computer processor to mark at least one non-updated firmware code image of said plurality of firmware code images stored in said rewritable non-volatile memory to prevent said marked firmware code image from subsequently being used as current said operational code.

7. The computer program product of claim 1, wherein said computer readable program code is embedded in a boot sector of said non-volatile memory.

8. The computer program product of claim 1, wherein at least one of said plurality of firmware code images stored in said rewritable non-volatile memory comprises operational code, and wherein said computer readable program code is embedded in said firmware code image which is currently operational.

9. The computer program product of claim 1, wherein said computer readable program code is embedded in at least one of said update firmware code images.

10. A computer program product usable with a programmable computer having computer readable program code embodied therein, for updating firmware stored in a rewritable non-volatile memory, said rewritable non-volatile memory capable of storing a plurality of firmware code images, wherein at least one of said plurality of firmware code images stored in said rewritable non-volatile memory comprises currently operational code, comprising:
   computer readable program code which causes a computer processor to determine which one of a plurality of firmware code images stored in said rewritable non-volatile memory is to be updated;
   computer readable program code which causes a computer processor to replace said determined firmware code image to be updated with an update firmware code image;
   computer readable program code which causes a computer processor to determine whether said update firmware code image has successfully been stored in said rewritable non-volatile memory to overwrite said determined firmware code image; and
   computer readable program code which causes a computer processor to mark at least one non-updated firmware code image of said plurality of firmware code images stored in said rewritable non-volatile memory to prevent said marked firmware code image from subsequently being used as a currently operational said firmware code image.

11. A computer program product usable with a programmable computer having computer readable program code embodied therein, comprising:
   computer readable program code which causes a computer processor to supply a plurality of update firmware code images that have position dependent code, said position dependent code specifying positions of a rewritable non-volatile memory, each said firmware code image position dependent code specifying different positions of said rewritable non-volatile memory from any other said firmware code image of said plurality of update firmware code images, such that each said update firmware code image is suitable for replacing a different firmware code image stored in said non-volatile memory.

12. A device, comprising:
   a computer processor; and
   a rewritable non-volatile memory storing computer readable program code for operating said computer processor, said computer readable program code comprising a plurality of firmware code images, said firmware code images having position dependent computer readable program code, and comprising computer readable program code which causes said computer processor to:
      determine which one of said plurality of firmware code images stored in said rewritable non-volatile memory is to be updated; and
      select one of a plurality of update firmware code images that has position dependent code suitable for replacing said determined firmware code image to be updated.

13. The device of claim 12, additionally comprising an interface, and wherein said computer readable program code which causes said computer processor to select said update firmware code image, causes said computer processor to indicate said selection at said interface.

14. The device of claim 12, additionally comprising a memory, and wherein said computer readable program code which causes said computer processor to select said update firmware code image, causes said computer processor to select said one update firmware code image from a plurality of update firmware code images stored in said memory.

15. The device of claim 14, additionally comprising computer readable program code which causes said computer processor to copy said selected one update firmware code image from said memory to overwrite said determined firmware code image at said rewritable non-volatile memory.

16. The device of claim 12, wherein said computer readable program code additionally comprises:
  computer readable program code which causes said computer processor to determine whether said selected one update firmware code image has successfully been stored in said rewritable non-volatile memory to overwrite said determined firmware code image; and
  computer readable program code which causes said computer processor to mark at least one non-updated firmware code image of said plurality of firmware code images stored in said rewritable non-volatile memory to prevent said marked firmware code image from subsequently being used as a currently operational code image.

17. The device of claim 12, wherein said computer readable program code stored in said rewritable non-volatile memory additionally comprises a boot sector, and wherein said computer readable program code is embedded in said boot sector of said non-volatile memory.

18. The device of claim 12, wherein said computer readable program code for determining which one of a plurality of firmware code images is to be updated, and for selecting said one of a plurality of update firmware code images, is embedded in said firmware code image which is currently operational.

19. A device, comprising:
  a computer processor;
  a rewritable non-volatile memory storing firmware computer readable program code for operating said computer processor, said firmware computer readable program code comprising a plurality of firmware code images, said firmware code images having position dependent computer readable program code;
  an interface; and
  a memory for temporarily storing computer readable program code embedded in at least one update firmware code image received at said interface, said computer readable program code causing said computer processor to:
  determine which one of said plurality of firmware code images stored in said rewritable non-volatile memory is to be updated; and
  select one of a plurality of update firmware code images that has position dependent code suitable for replacing said determined firmware code image to be updated.

20. A device, comprising:
  a computer processor; and
  a rewritable non-volatile memory storing computer readable program code for operating said computer processor, said computer readable program code comprising a plurality of firmware code images, said firmware code images having position dependent computer readable program code, and comprising computer readable program code which causes said computer processor to:
  determine which one of said plurality of firmware code images stored in said rewritable non-volatile memory is to be updated;
  replace said determined firmware code image to be updated with an update firmware code image;
  determine whether said update firmware code image has successfully been stored in said rewritable non-volatile memory to overwrite said determined firmware code image; and
  mark at least one nonupdated firmware code image of said plurality of firmware code images stored in said rewritable non-volatile memory to prevent said marked firmware code image from subsequently being used as a currently operational code image.

21. A method for updating firmware stored in a rewritable non-volatile memory, said rewritable non-volatile memory capable of storing a plurality of firmware code images, said firmware code images having position dependent code, comprising the steps of:
  determining which one of a plurality of firmware code images stored in said rewritable non-volatile memory is to be updated; and
  selecting one of a plurality of update firmware code images that has position dependent code suitable for replacing said determined firmware code image to be updated.

22. The method of claim 21, wherein said step of selecting said update firmware code image, additionally comprises indicating said selection at an interface.

23. The method of claim 21, wherein said step of selecting said update firmware code image, comprises selecting said one update firmware code image from a plurality of update firmware code images stored in memory.

24. The method of claim 23, additionally comprising the step of copying said selected one update firmware code image from said memory to overwrite said determined firmware code image at said rewritable non-volatile memory.

25. The method of claim 21, wherein at least one of said plurality of firmware code images stored in said rewritable non-volatile memory comprises currently operational code, and said method additionally comprises the steps of:
  determining whether said selected one update firmware code image has successfully been stored in said rewritable non-volatile memory to overwrite said determined firmware code image; and
  marking at least one non-updated firmware code image of said plurality of firmware code images stored in said rewritable non-volatile memory to prevent said marked firmware code image from subsequently being used as a currently operational code image.

26. A method for updating firmware stored in a rewritable non-volatile memory, said rewritable non-volatile memory capable of storing a plurality of firmware code images, wherein at least one of said plurality of firmware code images stored in said rewritable non-volatile memory comprises currently operational code, comprising the steps of:
  determining which one of a plurality of firmware code images stored in said rewritable non-volatile memory is to be updated;
  replacing said determined firmware code image to be updated with an update firmware code image;
  determining whether said update firmware code image has successfully been stored in said rewritable non-volatile memory to overwrite said determined firmware code image; and
  marking at least one non-updated firmware code image of said plurality of firmware code images stored in said rewritable non-volatile memory to prevent said marked firmware code image from subsequently being used as a currently operational said firmware code image.

27. A method for supplying firmware for updating firmware stored in a rewritable non-volatile memory, said rewritable non-volatile memory capable of storing a plurality of firmware code images, comprising:
  supplying a plurality of update firmware code images that have position dependent code, said position dependent code specifying positions of a rewritable non-volatile memory, each said firmware code image position dependent code specifying different positions of said rewritable non-volatile memory from any other said firmware code image of said plurality of update firmware code images, such that each said update firmware code image is suitable for replacing a different firmware code image stored in said non-volatile memory.

* * * * *